United States Patent
Masuda et al.

(10) Patent No.: US 8,096,166 B2
(45) Date of Patent: Jan. 17, 2012

(54) KNOCK DETECTION DEVICE FOR INTERNAL COMBUSTION ENGINE

(75) Inventors: Satoshi Masuda, Kariya (JP); Hirohiko Yamada, Okazaki (JP); Naoki Kokubo, Nukata-gun (JP); Shuhei Oe, Kariya (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 415 days.

(21) Appl. No.: 12/388,616

(22) Filed: Feb. 19, 2009

(65) Prior Publication Data

US 2009/0223280 A1  Sep. 10, 2009

(30) Foreign Application Priority Data

Mar. 4, 2008  (JP) .................................. 2008-52868

(51) Int. Cl.
*G01M 15/12* (2006.01)
(52) U.S. Cl. ..................... 73/35.03; 73/35.09; 73/114.07
(58) Field of Classification Search ................. 73/35.01, 73/35.03, 35.06, 35.07, 35.09, 114.02, 114.07
See application file for complete search history.

(56) References Cited

U.S. PATENT DOCUMENTS

| | | | | |
|---|---|---|---|---|
| 6,932,056 B1 * | 8/2005 | Tartt | ........................ | 123/406.37 |
| 7,206,691 B2 * | 4/2007 | Kaneko et al. | ................ | 701/111 |
| 7,243,529 B2 * | 7/2007 | Takemura et al. | ........... | 73/35.09 |
| 7,669,459 B2 * | 3/2010 | Yoshihara et al. | ........... | 73/35.06 |
| 7,677,083 B2 * | 3/2010 | Oe et al. | ........................ | 73/35.09 |
| 7,874,200 B2 * | 1/2011 | Oe et al. | ........................ | 73/35.09 |
| 7,945,379 B2 * | 5/2011 | Kaneko et al. | ................ | 701/111 |
| 2006/0185422 A1 * | 8/2006 | Iwade et al. | ................ | 73/35.09 |
| 2007/0012090 A1 | 1/2007 | Yoshihara et al. | | |
| 2007/0214869 A1 * | 9/2007 | Kaneko et al. | ............... | 73/35.09 |
| 2008/0276689 A1 * | 11/2008 | Tanaya et al. | ................ | 73/35.09 |
| 2008/0294328 A1 * | 11/2008 | Kaneko et al. | ................ | 701/111 |
| 2009/0150058 A1 * | 6/2009 | Kaneko et al. | ................ | 701/111 |

FOREIGN PATENT DOCUMENTS

JP    2005-188297    7/2005

OTHER PUBLICATIONS

U.S. Appl. No. 12/368,490, Masuda et al., filed Feb. 10, 2008.
US Patent Application of Masuda et al, U.S. Appl. No. 12/368,490, filed Feb. 10, 2009.
US Patent Application of Masuda et al, U.S. Appl. No. 12/388,651, filed Feb. 19, 2009.

* cited by examiner

*Primary Examiner* — Eric S McCall
(74) *Attorney, Agent, or Firm* — Nixon & Vanderhye P.C.

(57) ABSTRACT

An output signal of a knock sensor is converted by an A/D conversion part in a specified knock determination range. In a time-frequency analysis part, data of frequency, time, and vibration intensity are extracted at the same time from an output signal of the knock sensor and the time-varying patterns of vibration intensities in multiple frequency ranges are extracted. A knock determination part computes lengths (crank angle, or time period) from a starting point to a latest terminating point of the time-varying patterns of vibration intensity in at least two frequency ranges, which rise at a same time. The knock determination part executes a knock determination based on whether the lengths are greater than a knock determination threshold.

12 Claims, 9 Drawing Sheets

KNOCK DETECTION DEVICE FOR INTERNAL COMBUSTION ENGINE

CROSS-REFERENCE TO RELATED APPLICATION

This application is based on Japanese Patent Application No. 2008-52868 filed on Mar. 4, 2008, the disclosure of which is incorporated herein by reference.

FIELD OF THE INVENTION

The present invention relates to a knock detection device for an internal combustion engine. The knock detection device detects a knock on the basis of a time-varying pattern of vibration intensity extracted from an output signal of a knock signal output device.

BACKGROUND OF THE INVENTION

As described in JP-2005-188297A, when a knock is caused, a phenomenon called "a low frequency shift" is caused. In the low frequency shift, a peak frequency of a vibration component specific to the knock gradually shifts to a lower frequency side. When a peak frequency of vibration component of one knock frequency range extracted from the output signal of the knock sensor gradually shifts to a lower frequency side, it is determined that a knock is caused.

An internal combustion engine is provided with various systems such as a variable valve timing controller and a super-charger in order to improve an output, a fuel economy and an environmental performance. A direct injection engine varies a fuel injection timing according to a combustion mode. Thus, many kinds of noises tend to superimpose on the signal of the knock sensor in a knock determination range. However, in the knock detection apparatus described in JP-2005-188297A, it is only determined whether a vibration component of one knock frequency range shifts to a lower frequency side in time sequence. Thus, as shown in FIG. 4, when a plurality of noises are superimposed on the signal of the knock sensor in time sequence in one knock determination range, there is a possibility of making an erroneous determination that one continuous vibration component will shift apparently to a lower frequency side. Therefore, when it is only determined whether the vibration component of one frequency range shifts to a lower frequency side, there is a possibility of making an erroneous determination that a knock is caused.

A noise generated by a single vibration, such as a valve seating noise or a direct-injection injector noise, does not continue for a long period like a knock vibration. However, there is a noise continuing for a long period in a specified frequency like a piston slap noise generated due to a piston sliding on a cylinder inner wall. Such a noise continuing for a long time in a specified frequency may cause an erroneous knock determination.

SUMMARY OF THE INVENTION

The present invention is made in view of the above matters, and it is an object of the present invention to provide a knock detection device for an internal combustion engine, which can avoid an erroneous knock determination due to noises being superimposed on the output signal of a knock signal output device. Hence a knock determination accuracy is enhanced.

According to the present invention, a knock detection device includes a knock signal output means for outputting an output signal of which waveform is varied according to a knock caused while the internal combustion engine is operated. The device includes a vibration intensity extraction means for extracting time-varying patterns of vibration intensities in multiple frequency ranges from an output signal of the knock signal output means. The device further includes a knock determination means for executing a knock determination based on lengths from a starting point to a terminating point of the time-varying patterns of vibration intensity in at least two frequency ranges, which rise at a same time.

When a knock is caused, not only a knock vibration component of a basic frequency of the knock (first-order resonance frequency which is determined by the diameter of the bore of a cylinder and which is about, for example, 7.5 kHz), but also knock vibration components develop at the same time in second-order and higher-order resonance frequency ranges. A phenomenon that plural noises are continuously caused like a low frequency shift is not a phenomenon that develops in multiple frequency ranges at the same time but a phenomenon that develops in only one frequency range. Moreover, a noise continuing for a long time period, such as a piston slap noise, develops in only one specified frequency range.

According to the present invention, even if a low frequency shift or a piston slap noise that cannot be distinguished from the knock in any one of the frequency ranges is developed due the noises being superimposed on the output signal of the knock sensor, it is possible to prevent making an erroneous determination that the low frequency shift developed by the noises is the knock. Thus, the knock determination accuracy is enhanced.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described hereinafter.

First Embodiment

Figure 1:
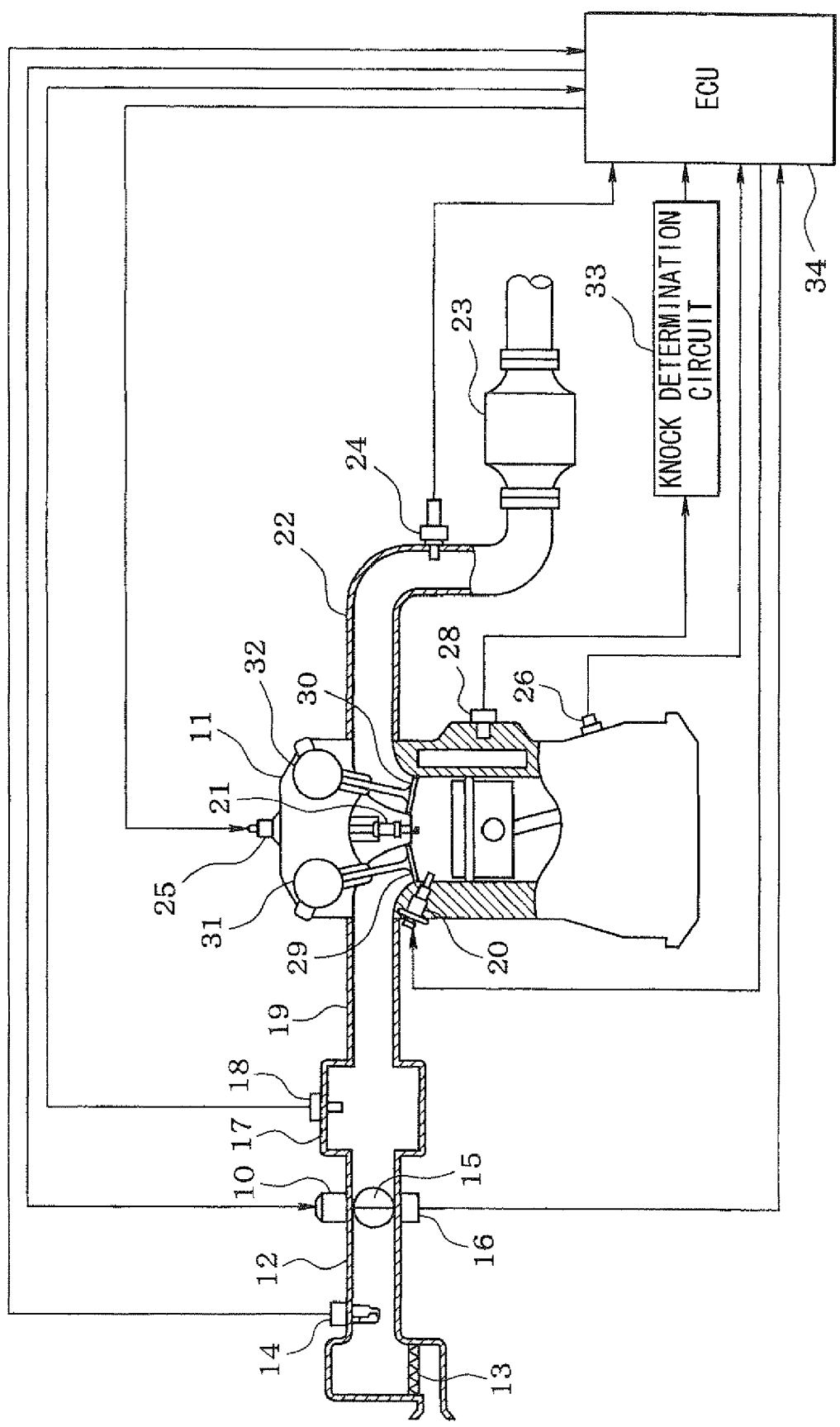
FIG. 1 is a schematic view of an engine control system according to a first embodiment of the present invention.
Figure 2:
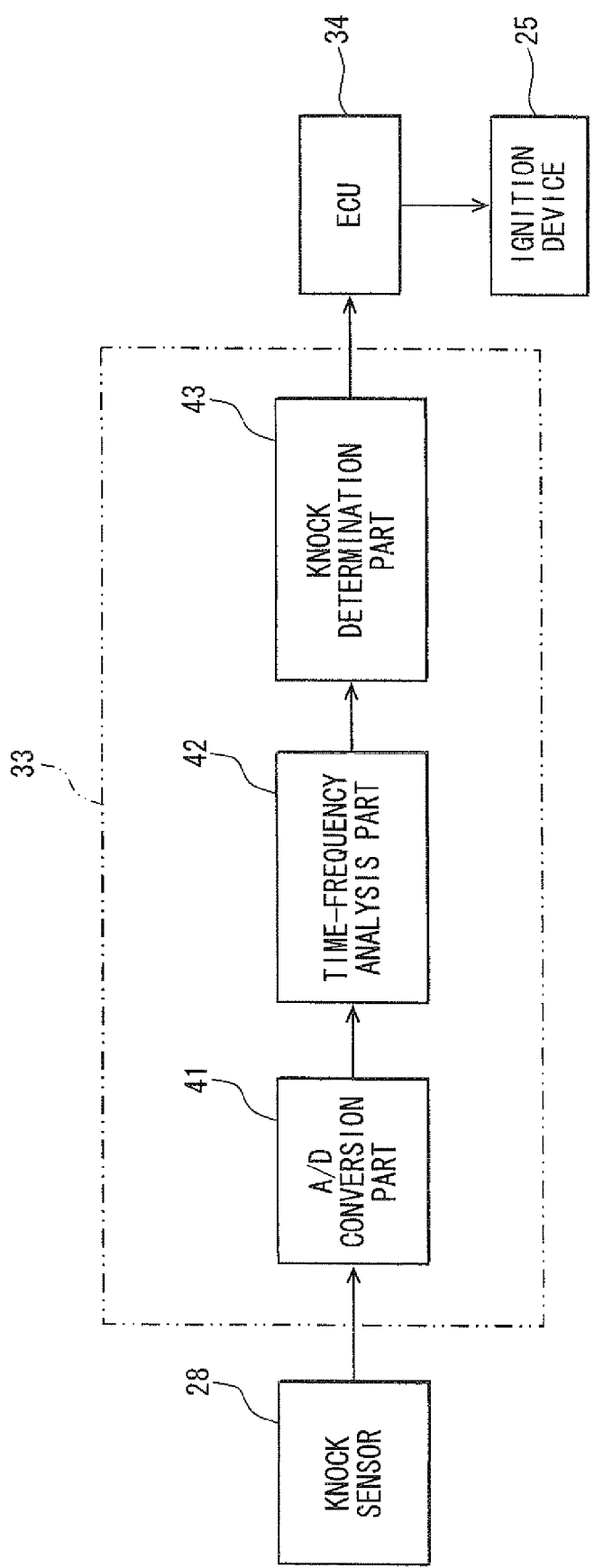
FIG. 2 is a block diagram showing a circuit for processing the output signal of a knock sensor to make a knock determination according to a first embodiment.

Referring to FIGS. 1 to 5, a first embodiment will be described hereinafter. Referring to FIG. 1, an engine control system is explained.

An air cleaner 13 is arranged upstream of an intake pipe 12 of an internal combustion engine 11. An airflow meter 14 detecting an intake air flow rate is provided downstream of the air cleaner 13. A throttle valve 15 driven by a motor 10 and a throttle position sensor 16 detecting a throttle position are provided downstream of the air flow meter 14.

A surge tank 17 including an intake air pressure sensor 18 is provided downstream of the throttle valve 15. The intake air pressure sensor 18 detects intake air pressure. An intake manifold 19 is connected to the surge tank 17. A fuel injector 20 is mounted on each cylinder for injecting fuel into an interior of the cylinder respectively. A spark plug 21 is mounted on a cylinder head of the engine 11 corresponding to each cylinder. Each spark plug 21 receives high voltage generated by an ignition device 25 to ignite air-fuel mixture in each cylinder.

The engine 11 is provided with an intake valve timing controller 31 which adjusts a valve timing of the intake valve 29, and an exhaust valve timing controller 32 which adjusts valve timing of an exhaust valve 30.

An exhaust pipe 22 of the engine 11 is provided with a three-way catalyst 23 purifying CO, HC, NOx and the like in the exhaust gas. An exhaust gas sensor 24 detecting air-fuel ratio or rich/lean of the exhaust gas is disposed upstream of the three-way catalyst 25. A crank angle sensor 26 is installed on a cylinder block of the engine 11 to output crank angle pulses when a crank shaft rotates a predetermined angle. Based on these crank angle pulses of the crank angle sensor 26, a crank angle and an engine speed are detected.

The cylinder block of the engine 11 is mounted with a knock sensor 28 for detecting knock vibration, and the output signal of the knock sensor 28 is digitally processed by a knock determination circuit 33 to perform a knock determination. The knock sensor 28 corresponds to a knock signal output means. The knock determination result made by the knock determination circuit 33 is inputted to an electronic control unit 34, which is referred to as ECU 34, hereinafter. The ECU 34 includes a microcomputer which executes an engine control program stored in a Read Only Memory (ROM) to control a fuel injection quantity of the fuel injector 20, an ignition timing of the spark plug 21, and a valve timing of the variable valve timing controllers 31, 32. The ECU 34 repeatedly performs a following knock control so that an ignition timing comes close to a knock limit. That is, when the knock determination circuit 33 detects no knock, the ignition timing is advanced, whereas when the knock determination circuit 33 detects a knock, the ignition timing is retarded.

Figure 3:
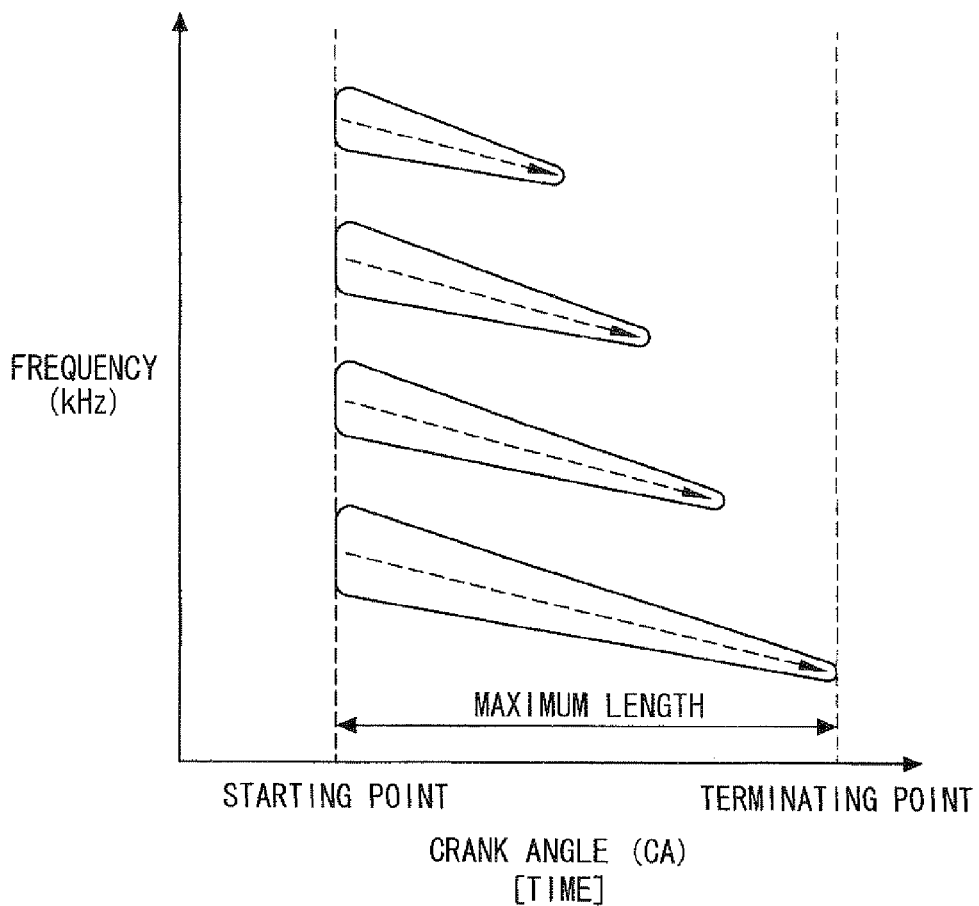
FIG. 3 is a graph schematically showing time-varying patterns of vibration intensity in multiple frequency ranges extracted from output signals of a knock sensor according to the first embodiment.
Figure 4:
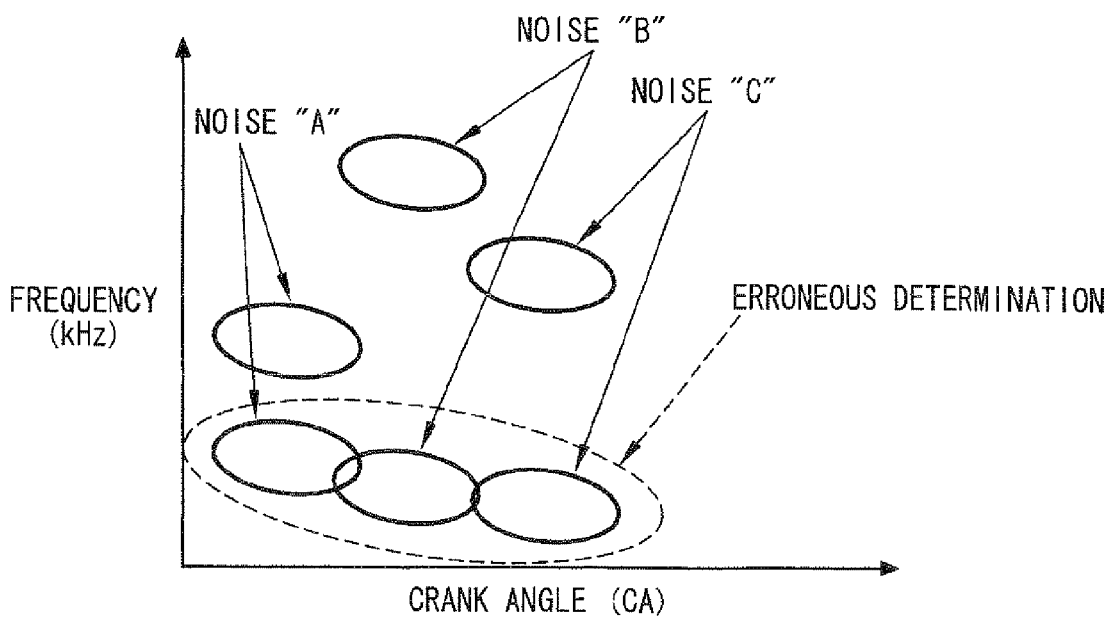
FIG. 4 is a graph showing an example in which when the time-varying pattern of vibration intensity is extracted from only one frequency range, an erroneous determination that knock is caused is made due to noises being superimposed on the output signal of the knock sensor.

As shown in FIG. 3, when knock is caused, not only a knock vibration component of the basic frequency of the knock (first-order resonance frequency determined by the diameter of the bore of the cylinder) but also knock vibration components of the second-order or more, that is, higher-order resonance frequency ranges develop at the same time. When the knock is caused, the low frequency shift occurs. That is, the vibration components of these plural frequency ranges gradually shift to a lower frequency side. As shown in FIG. 4, when a plurality of noises are superimposed on the output signal of the knock sensor 28 in time sequence within one knock determination range, there is a possibility of making an erroneous determination that one continuous vibration component will apparently causes a low frequency shift. Thus, when it is only determined whether a vibration component of one frequency range causes a low frequency shift, there is a possibility of making an erroneous knock determination.

A noise generated by a single vibration, such as a valve seating noise or a direct-injection injector noise, does not continue for a long period like a knock vibration. However, there is a noise continuing for a long period in a specified frequency like a piston slap noise generated due to a piston sliding on a cylinder inner wall. Such a noise continuing for a long time in a specified frequency may cause an erroneous knock determination.

When a knock is caused, vibrations in multiple frequency ranges rise at the same time. Based on this phenomenon, the time-varying patterns of vibration intensity in multiple frequency ranges are extracted from the output signal of the knock sensor 28, and a knock determination is executed based on lengths (crank angle, or time period) from a starting point to a latest terminating point of the time-varying patterns of vibration intensity in at least two frequency ranges, which rise at a same time.

In the present first embodiment, a time-frequency analysis is used to extract the time-varying patterns of vibration intensity in multiple frequency ranges from the output signals of the knock sensor 28. A short-time Fourier transform (STFT), a wavelet transform, a Wigner distribution, or the like is used as the time-frequency analysis.

The processing of the time-frequency analysis is performed by a time-frequency analysis part 42 in the knock determination circuit 33. The time-frequency analysis part 42 corresponds to a vibration intensity extraction means. The output signal of the knock sensor 28 is converted to a digital value by an A/D conversion part 41. The converted signal is processed by the time-frequency analysis part 42. When a knock is caused, as shown in FIG. 3, the time-varying patterns are extracted in multiple frequency ranges. The frequency ranges in which the time-varying pattern of vibration intensity is extracted include a range of a basic frequency, which is the lowest frequency of the frequencies of the knock vibrations, and the ranges of the second or higher-order resonance frequencies of the knock vibrations. The basic frequency is the first-order resonance frequency determined by the diameter of the bore of the cylinder.

Based on the analysis result of the time-frequency analysis part 42, a knock determination part 43 computes lengths (crank angle, or time period) from a starting point to a latest terminating point of the time-varying patterns of vibration intensity in at least two frequency ranges, which rise at a same time. Then, the knock determination part 43 executes a knock determination based on whether the lengths are greater than a knock determination threshold.

Figure 5:
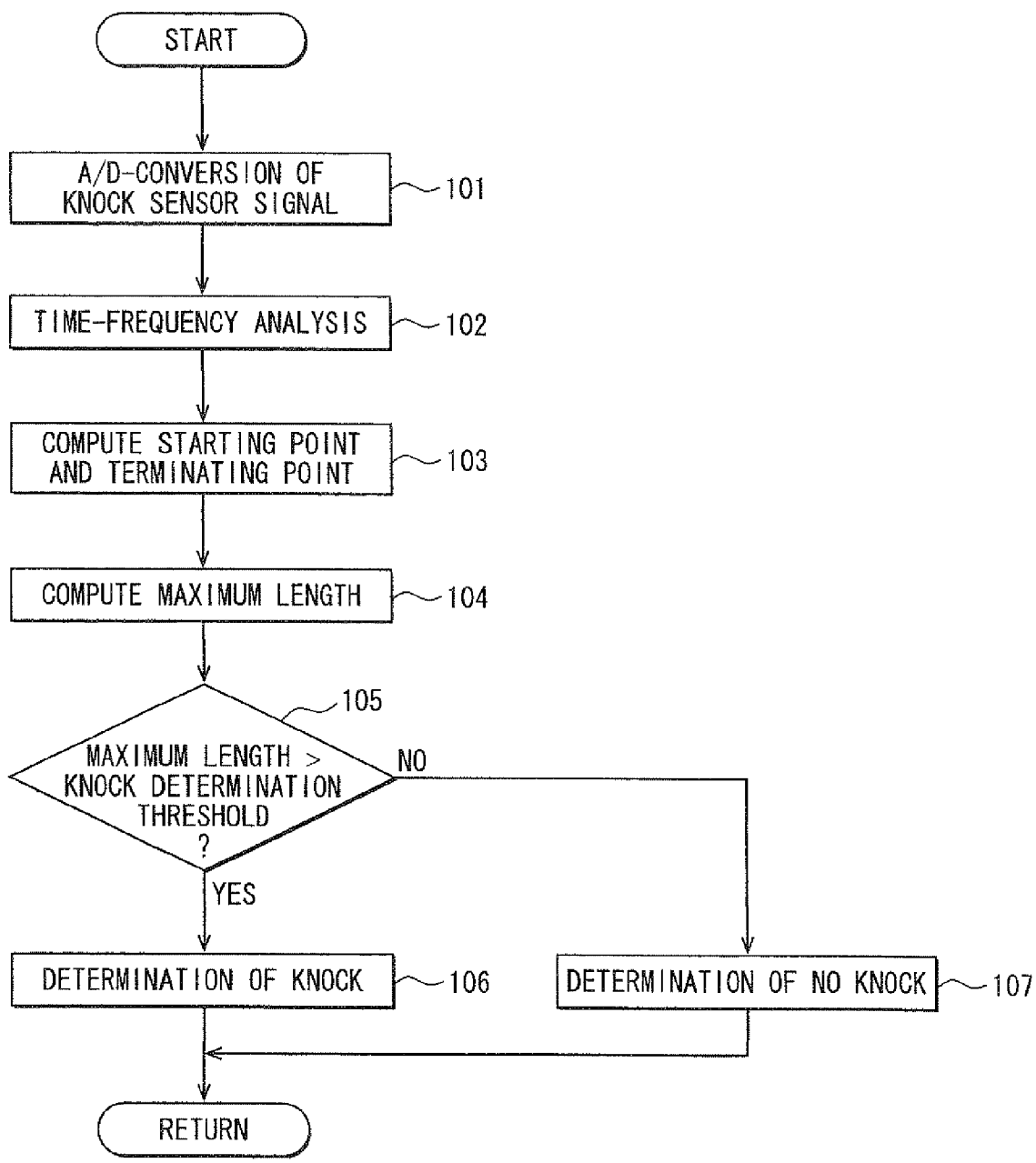
FIG. 5 is a flow chart showing a processing of a knock determination routine according to a first embodiment.

The above-mentioned knock determination processing is performed by the knock determination circuit 33 according to a knock determination routine shown in FIG. 5. The knock determination routine shown in FIG. 5 is performed for each one ignition of each cylinder. In step 101, the output signal of the knock sensor 28 is converted by the A/D conversion part 41 to a digital signal in a specified knock determination range. In step 102, the time-frequency analysis (STFT, wavelet transform, Wigner distribution, or the like) is performed to extract the data of frequency, time, and vibration intensity at the same time from the output signal of the knock sensor 28, thereby extracting the time-varying patterns of vibration intensity in the multiple frequency ranges.

Then, the procedure proceeds to step 103 in which the knock determination part 43 computes a starting point and a latest terminating point of the time-varying patterns of vibration intensity in at least two frequency ranges, which rise at the same time. In step 104, the knock determination part 43 computes a maximum length of the time-varying pattern of vibration intensity.

Then, the procedure proceeds to step 105 in which the maximum length is compared with the knock determination threshold. When the maximum length is greater than the knock determination threshold, the procedure proceeds to step 106 in which it is determined that the knock is caused. When the maximum length is not greater than the knock determination threshold, the procedure proceeds to step 107 in which it is determined that no knock is caused. With this manner, even if a low frequency shift or a piston slap noise that cannot be distinguished from the knock in any one of the frequency ranges is developed due the noises being superimposed on the output signal of the knock sensor 28, it is possible to prevent making an erroneous determination that the low frequency shift developed by the noises is the knock. Thus, the knock determination accuracy is enhanced.

Second Embodiment

Figure 6:
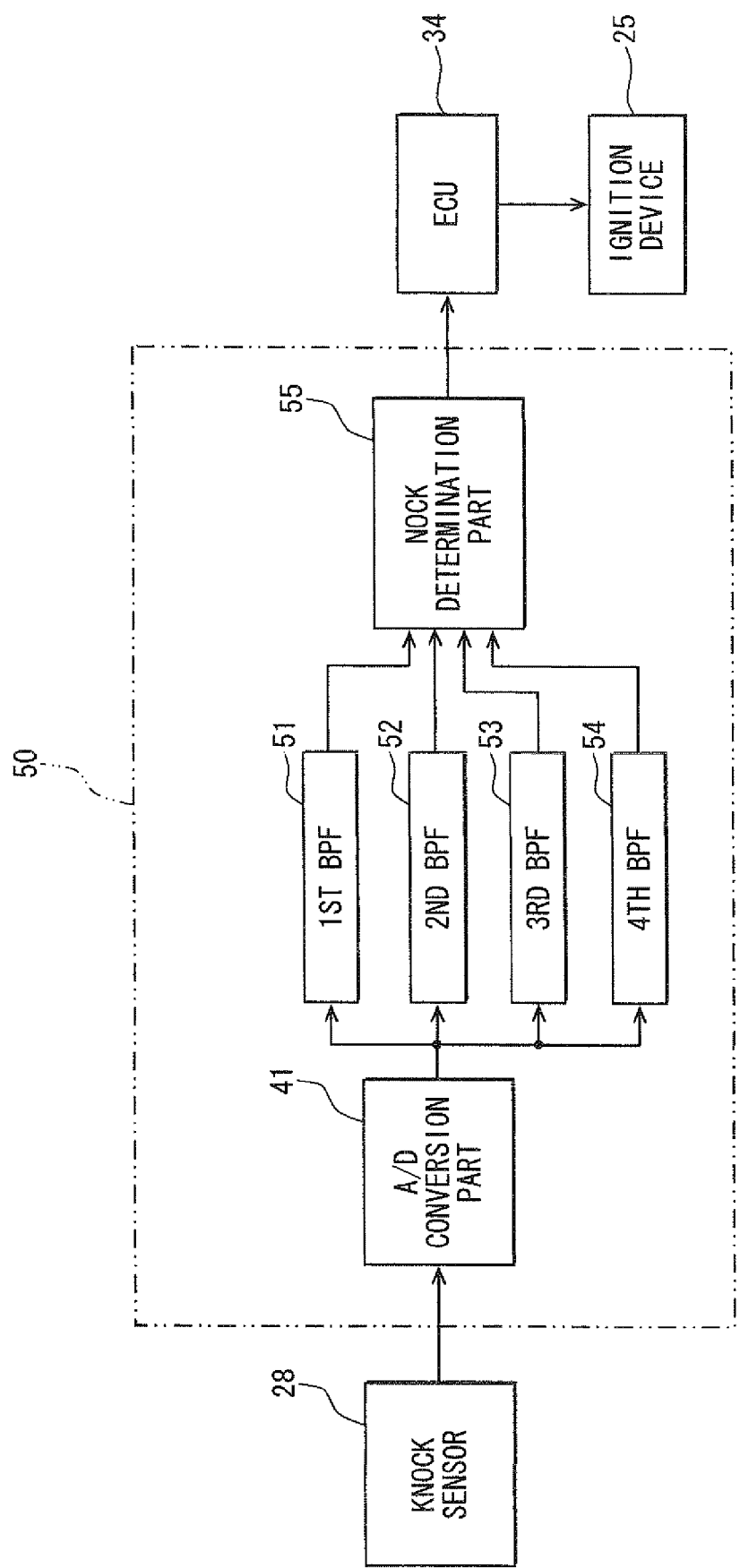
FIG. 6 is a block diagram showing a circuit for processing the output signal of a knock sensor to make a knock determination according to a second embodiment.
Figure 7:
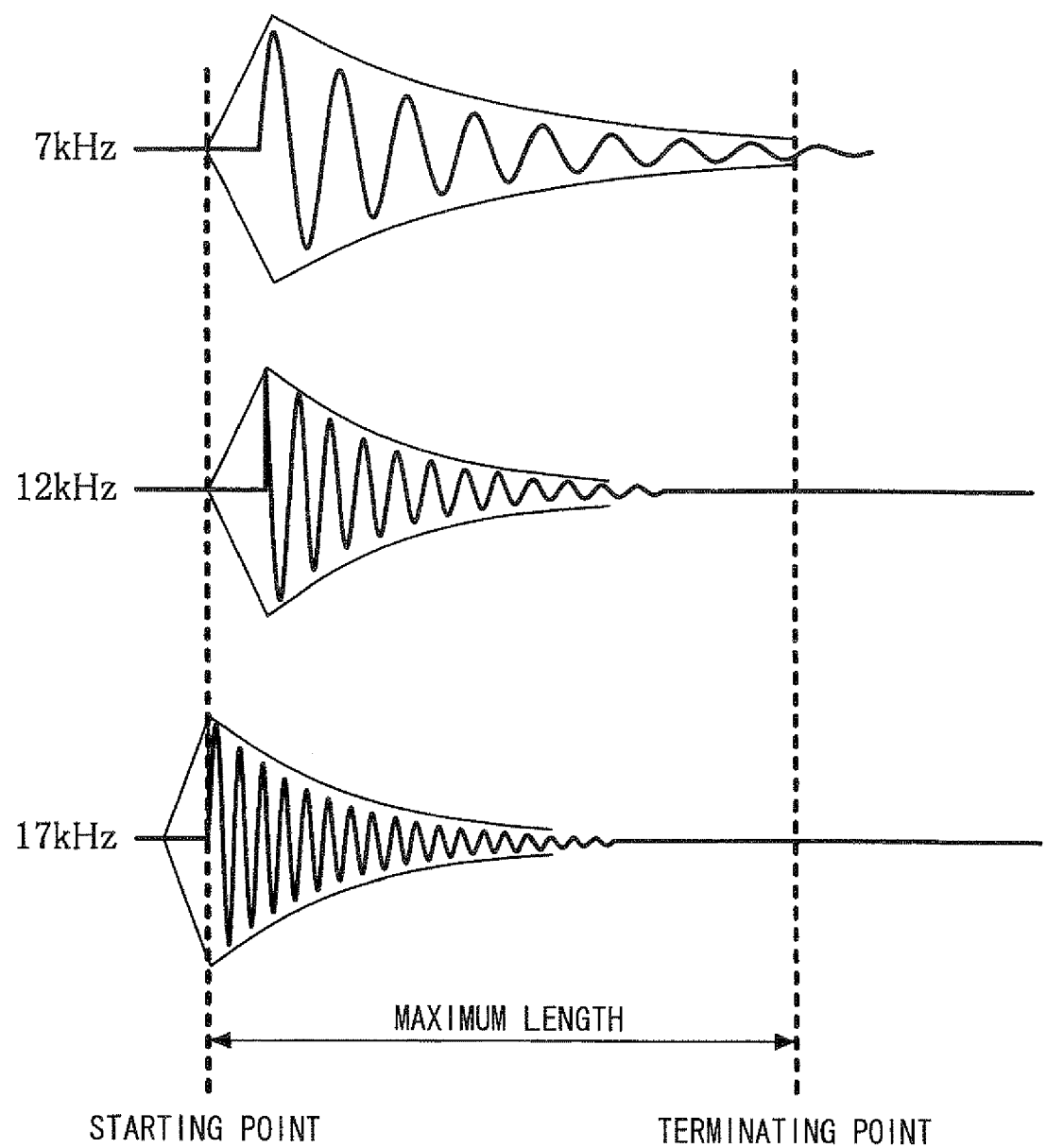
FIG. 7 is a time chart showing a vibration waveforms which are processed by band-pass filters according to the second embodiment.
Figure 8:
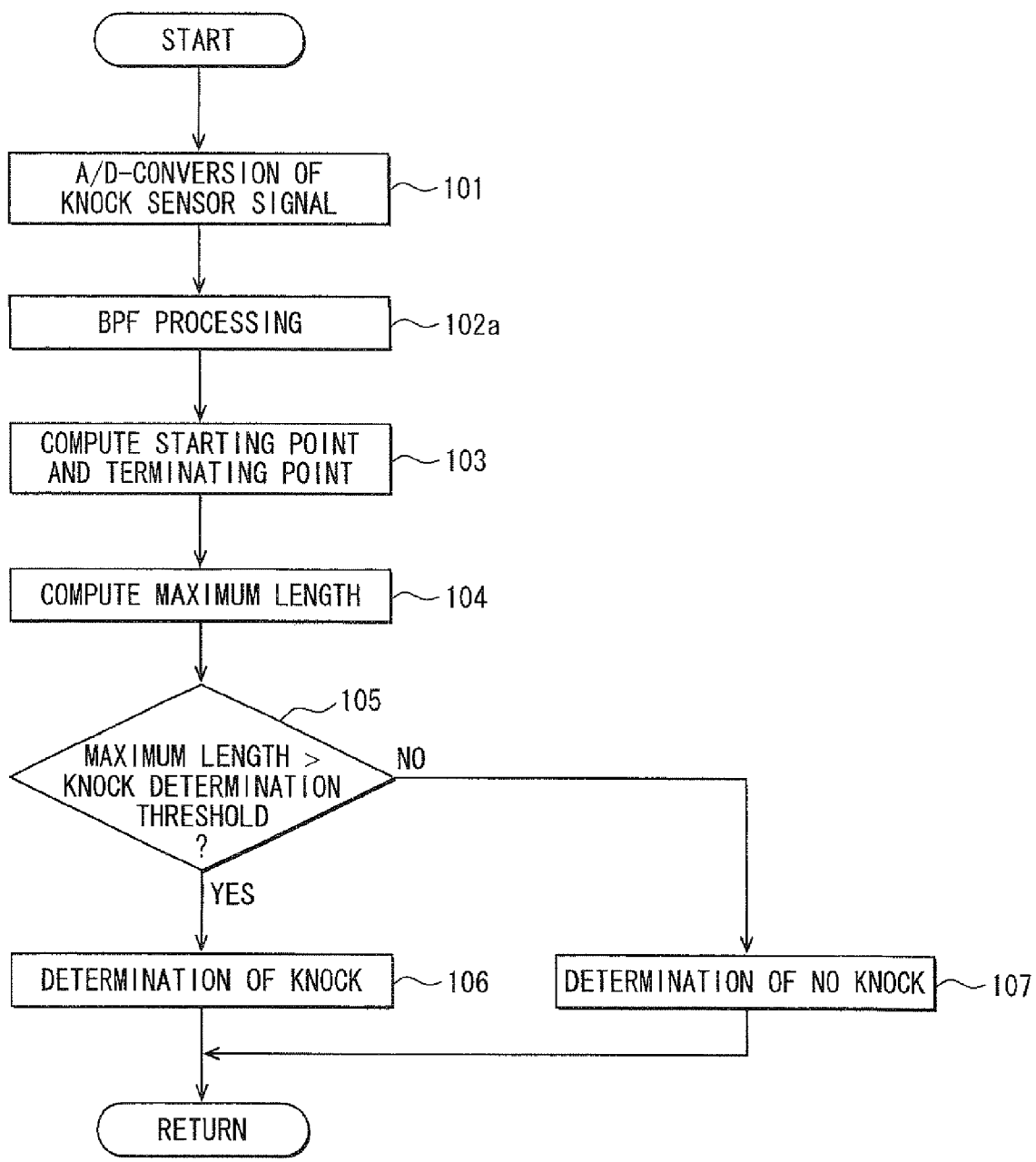
FIG. 8 is a flow chart showing a processing of a knock determination routine according to a second embodiment.

In a second embodiment shown in FIGS. 6 to 8, a knock determination circuit 50 is provided with multiple band pass filters (a first BPF 51 to a fourth BPF 54) for extracting the time-varying patterns of vibration intensity in multiple frequency ranges from the output signal of the knock sensor 28, which is converted to a digital value by the AD conversion part 41. The knock determination part 55 executes a knock determination based on whether the maximum length of at least two time-varying patterns of vibration intensity which rise at the same time is greater than the knock determination threshold.

The frequency ranges extracted by the first to the fourth BPFs 51 to 54 are a first-order frequency range (basic frequency range of knock vibration) and higher-order frequency ranges, such as a second-order to a fourth order frequency ranges. The first-order frequency range (pass band range of the first BPF 51) is set to a frequency range including a basic frequency that is the lowest frequency of the frequencies of the knock vibration. The basic frequency is a first-order resonance frequency determined by the diameter of the bore of the cylinder, for example, approximately 7 kHz The second to fourth order frequency band ranges (frequency band ranges passing through the second to fourth band-pass filters 52-54) are established to include a second to a fourth order resonance frequency (for example, about 12 kH, 17 kH, 21 kH). The number of the BPFs 51 to 54 is not limited to four but may be three, five or more.

The above-mentioned knock determination processing is performed by the knock determination circuit 50 according to a knock determination routine shown in FIG. 8. The knock determination routine shown in FIG. 8 is different from the knock determination routine shown in FIG. 5 only in that the processing in step 102 in FIG. 5 is replaced by processing in step 102a. The other steps in FIG. 8 are the same as those in FIG. 5.

In step 101, the output signal of the knock sensor 28 is converted by the A/D conversion part 41 to a digital signal in a specified knock determination range. In step 102a, the output signals of the knock sensor 28 are processed by the first to fourth BPFs 51-54 to extract the time-varying patterns of vibration intensity in the multiple frequency ranges, as shown in FIG. 7. Then, the procedure proceeds to step 103 in which the knock determination part 43 computes a starting point and a latest terminating point of the time-varying patterns of vibration intensity in at least two frequency ranges, which rise at the same time. In step 104, the knock determination part 43 computes a maximum length of the time-varying pattern of vibration intensity. Then, the procedure proceeds to step 105 in which the maximum length is compared with the knock determination threshold. When the maximum length is greater than the knock determination threshold, the procedure proceeds to step 106 in which it is determined that the knock is caused. When the maximum length is not greater than the knock determination threshold, the procedure proceeds to step 107 in which it is determined that no knock is caused.

According to the second embodiment, the same advantage can be achieved as the first embodiment.

Third Embodiment

As shown in FIG. 3, when a knock is caused a length of the time-varying pattern of vibration intensity becomes longer as the frequency becomes lower. The length of the time-varying pattern of vibration intensity becomes shorter as the frequency becomes higher. The noise does not have such a tendency.

Figure 9:
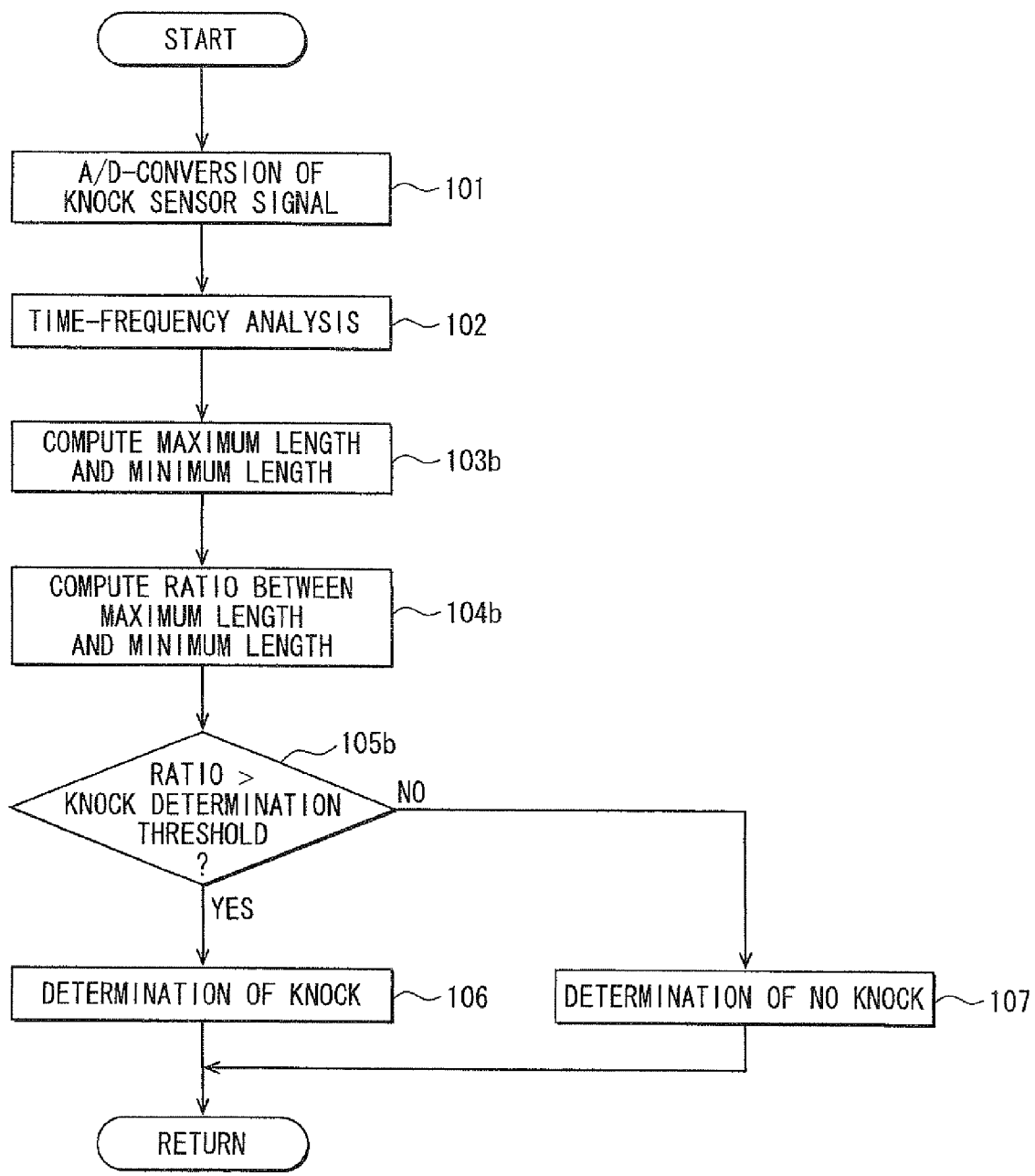
FIG. 9 is a flow chart showing a processing of a knock determination routine according to a third embodiment.

In the third embodiment, a knock determination routine shown in FIG. 9 is executed. The knock determination is executed based on a ratio between a maximum length and a minimum length of time-varying pattern of vibration intensity which rise at the same time.

The knock determination routine shown in FIG. 9 is different from the knock determination routine shown in FIG. 5 only in that the processings in steps 103-105 in FIG. 5 are replaced by processings in step 103b-105b. The other steps in FIG. 9 are the same as those in FIG. 5.

In step 101, the output signal of the knock sensor 28 is converted by the A/D conversion part 41 to a digital signal in a specified knock determination range. In step 102, the time-frequency analysis (STFT, wavelet transform, Wigner distribution, or the like) is performed to extract the data of frequency, time, and vibration intensity at the same time from the output signal of the knock sensor 28, thereby extracting the time-varying patterns of vibration intensity in the multiple frequency ranges.

Then, the procedure proceeds to step 103b in which a maximum length and a minimum length of time-varying pattern of vibration intensity which rise at the same time are computed. In step 104b, a ratio between the maximum length and the minimum length is computed. Then, the procedure proceeds to step 105b in which the ratio between the maximum length and the minimum length is compared with the knock determination threshold. When the ratio is greater than the knock determination threshold, the procedure proceeds to step 106 in which it is determined that the knock is caused. When the ratio is not greater than the knock determination threshold, the procedure proceeds to step 107 in which it is determined that no knock is caused.

According to the third embodiment, the same advantage can be achieved as the first embodiment.

Fourth Embodiment

Figure 10:
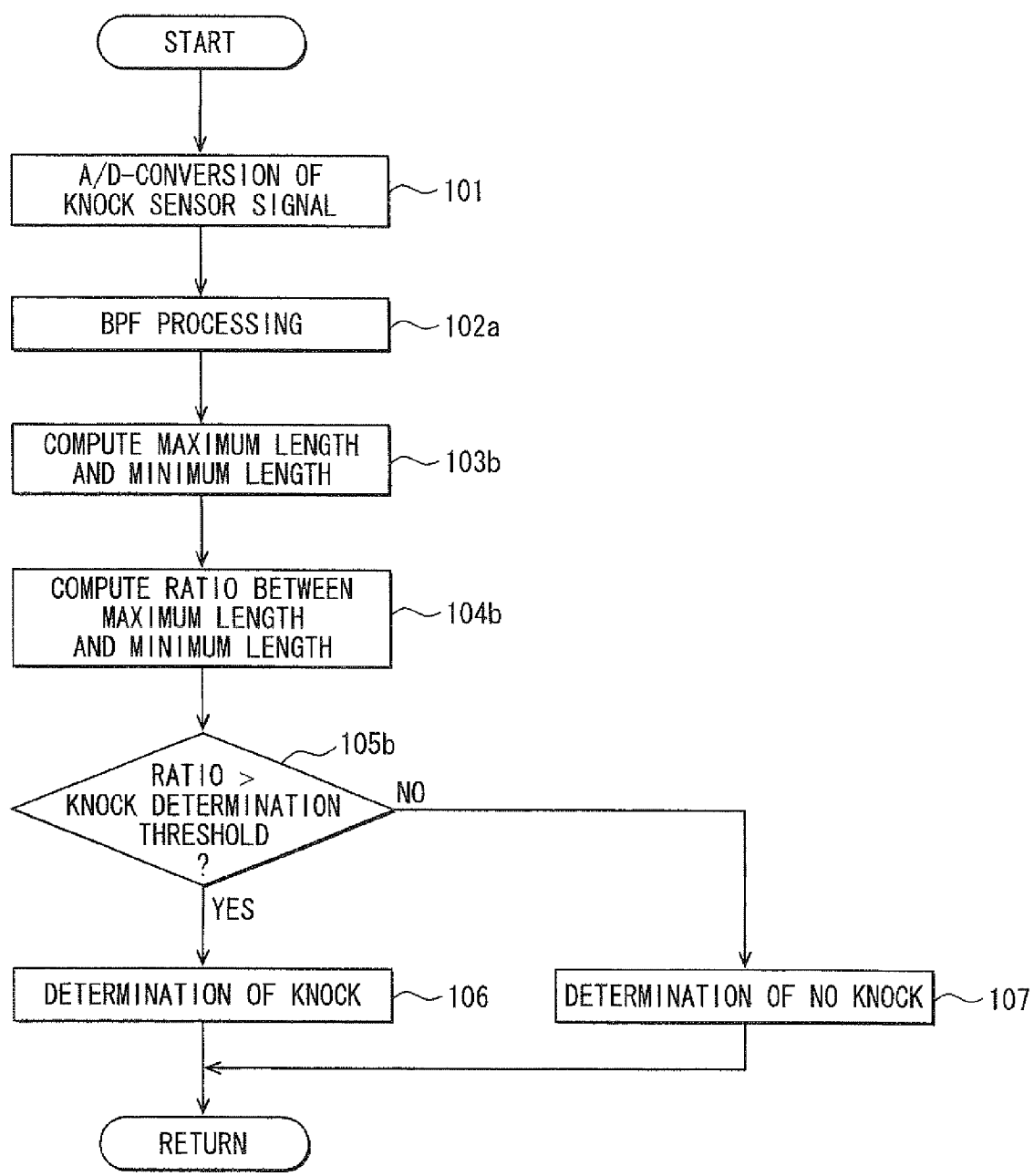
FIG. 10 is a flow chart showing a processing of a knock determination routine according to a fourth embodiment.

In a fourth embodiment, a knock determination routine shown in FIG. 10 is executed. In step 101, the output signal of the knock sensor 28 is converted by the A/D conversion part 41 to a digital signal in a specified knock determination range. In step 102a, the output signals of the knock sensor 28 are processed by the first to fourth BPFs 51-54 to extract the time-varying patterns of vibration intensity in the multiple frequency ranges. Then, the procedure proceeds to step 103b in which a maximum length and a minimum length of time-varying pattern of vibration intensity which rise at the same time are computed. In step 104b, a ratio between the maximum length and the minimum length is computed. Then, the procedure proceeds to step 105b in which the ratio between the maximum length and the minimum length is compared with the knock determination threshold. When the ratio is greater than the knock determination threshold, the procedure proceeds to step 106 in which it is determined that the knock is caused. When the ratio is not greater than the knock determination threshold, the procedure proceeds to step 107 in which it is determined that no knock is caused.

Also in the fourth embodiment described above, the same advantage as those in the first embodiment can be obtained.

A ratio of length of time-varying pattern of vibration intensity may be computed between adjacent two frequency ranges. Alternatively, a ratio of length of time-varying pattern of vibration intensity may be computed between an intermediate frequency range and the lowest (or highest) frequency range. Alternatively, a ratio of length of time-varying pattern of vibration intensity may be computed between an average of all lengths of time-varying pattern of vibration intensity in multiple frequency ranges and a length in the lowest (or highest) frequency range.

In the above embodiments, the knock sensor 28 is used as the knock signal output means of which output signal waveform is varied according to the knock caused during the engine operation. Alternatively, a cylinder pressure sensor for detecting a cylinder pressure or an ion current detection means for detecting ions produced by the combustion of the air-fuel mixture in the cylinder through the ignition plug 21 or the like may be used as the knock signal output means.

The present invention is not limited to a direct injection engine shown in FIG. 1 but can be applied also to an intake port injection engine and a dual injection engine having fuel injectors mounted in both of the intake port and the cylinder. Further, the present invention can be applied to an engine not mounted with a variable valve unit such as a variable valve timing controller. The present invention can be variously modified and put into practice within a range not departing from the spirit and scope of the present invention.

What is claimed is:

1. A knock detection device for an internal combustion engine, comprising:
   a knock signal output means for outputting an output signal of which waveform is varied according to a knock caused while the internal combustion engine is operated;
   a vibration intensity extraction means for extracting time-varying patterns of vibration intensity in multiple frequency ranges from the output signal of the knock signal output means; and
   a knock determination means for executing a knock determination based on lengths from a starting point of the time-varying patter vibration intensity in at least two frequency ranges to a terminating point of the time-varying patterns of vibration intensity in the at least two frequency ranges, which rise at a same time.

2. A knock detection device according to claim 1, wherein the vibration intensity extraction means performs a time-frequency analysis of the output signal in order to extract the time-varying patterns of vibration intensity in the multiple frequency ranges.

3. A knock detection device according to claim 1, wherein the vibration intensity extraction means processes an output signal of the knock signal output means by a plurality of band-pass filters extracting a plurality of specified frequency ranges to extract the time-varying patterns of vibration intensity in the multiple frequency ranges.

4. A knock detection device according to claim 1, wherein the knock determination means executes the knock determination based on a length from a starting point to a latest terminating point of the time-varying patterns of vibration intensity in at least two frequency ranges, which rise at a same time.

5. A knock detection device according to claim 1, wherein the knock determination means executes the knock determination based on a ratio between lengths from a starting point to a terminating point of the time-varying pattern of vibration intensity in any two frequency ranges.

6. A knock detection device according to claim 5, wherein the knock determination means executes the knock determination based on a ratio between a maximum length of the time-varying pattern of vibration intensity and a minimum length of the time-varying pattern of vibration intensity in at least two frequency ranges, which rise at a same time.

7. A knock detection device for an internal combustion engine, comprising:
   a knock signal output unit for outputting an output signal of which waveform is varied according to a knock caused while the internal combustion engine is operated;
   a vibration intensity extraction unit for extracting time-varying patterns of vibration intensity in multiple frequency ranges from the output signal of the knock signal output unit; and
   a knock determination unit for executing a knock determination based on lengths from a starting point to a terminating point of the time-varying patterns of vibration intensity in at least two frequency ranges, which rise at a same time;
   wherein the starting and terminating points are beginning and ending points, respectively, of the time-varying pattern itself.

8. A knock detection device according to claim 7, wherein the vibration intensity extraction unit performs a time-frequency analysis of the output signal in order to extract the time-varying patterns of vibration intensity in the multiple frequency ranges.

9. A knock detection device according to claim 7, wherein the vibration intensity extraction unit processes an output signal of the knock signal output unit by a plurality of band-pass filters extracting a plurality of specified frequency ranges to extract the time-varying patterns of vibration intensity in the multiple frequency ranges.

10. A knock detection device according to claim 7, wherein the knock determination unit executes the knock determination based on a length from a starting point to a latest terminating point of the time-varying patterns of vibration intensity in at least two frequency ranges, which rise at a same time.

11. A knock detection device according to claim 7, wherein the knock determination unit executes the knock determination based on a ratio between lengths from a starting point to a terminating point of the time-varying pattern of vibration intensity in any two frequency ranges.

12. A knock detection device according to claim 11, wherein the knock determination unit executes the knock determination based on a ratio between a maximum length of the time-varying pattern of vibration intensity and a minimum length of the time-varying pattern of vibration intensity in at least two frequency ranges, which rise at a same time.

* * * * *